Patented June 23, 1942

2,287,410

UNITED STATES PATENT OFFICE 2,287,410

ADHESIVE

Ernest R. Boller, Twinsburg Township, Summit County, Ohio, assignor to E. I. du Pont de Nemours & Company, Wilmington, Del., a corporation of Delaware No Drawing. Application December 17, 1940, Serial No. 370,479

11 Claims. (Cl. 106—84)

This invention relates to methods for making adhesives and to the adhesive compositions produced. More particularly, the invention is directed to processes in which china clay, deflocculated as a fluid aqueous slip, is added to and dispersed in a concentrated aqueous sodium silicate solution with such agitation that the dispersion is effected without flocculation of the clay, and is further directed to compositions characteristic of those produced by the foregoing described methods and which have a yield point of about from 25 to 150 dynes per square centimeter, a mobility coefficient of about from 0.3 to 4.0 rhes, a thixotropy ratio greater than 1.3, and which contain about from 5 to 12 per cent of china clay, about from 24 to 38 per cent sodium silicate solids with an $SiO_2:Na_2O$ weight ratio of about 3.0 to 3.4, the amounts of clay and sodium silicate solids being so related that their sum is about from 35 to 45 per cent by weight of the adhesive.

It is an object of this invention to provide compositions having rheological properties such that the compositions are better adapted than materials heretofore available for adhesive uses and are especially well suited as adhesives in the manufacture of corrugated fiberboard. Another object is to provide silicate-clay adhesives having yield values such that the adhesives do not flow from position when applied to the apieces of corrugated paper used in making corrugated fibreboard and can be built up to compensate for poor machine adjustment or low flutes on the corrugating rolls of paperboard machines. Another object is to provide silicate-clay adhesives with flow properties such that they may be readily and economically handled by pumping. Another object is to provide silicate-clay adhesives in which the clay is present in a dispersed, slow-settling form. Another object is to provide practicable, economical methods for producing such adhesives. Still other objects will appear hereinafter.

The foregoing and related objects of this invention may be accomplished by processes comprising deflocculating china clay in water as a fluid slip and adding this slip to and dispersing it in a concentrated aqueous sodium silicate solution with such agitation that the dispersion is effected without flocculation of the clay, the compositions produced having a yield point of about from 25 to 150 dynes per square centimeter, a mobility coefficient of about from 0.3 to 4.0 rhe, a thixotropy ratio greater than about 1.3, and containing about from 5 to 12 per cent clay and about 24 to 38 per cent sodium silicate solids having an $SiO_2:Na_2O$ weight ratio of 3.0 to 3.4, the amounts of clay and sodium silicate solids being so related that their sum is about from 35 to 45 per cent by weight of the adhesive.

The compositions of this invention are particularly well adapted for use in the manufacture of fiberboard. Their suitability is attributable to their unique rheological properties, that is, their flow characteristics such as yield point, mobility coefficient, and thixotropy ratio. The importance of these rheological properties to the behavior of silicate-clay adhesives has hitherto been poorly understood, and accordingly, the control of the composition and characteristics of adhesives to obtain optimum rheological properties has not been practiced. The rheological properties of the compositions of this invention have such values that they are equal to or approach the ideal values required in an adhesive for use on a corrugated or solid fiberboard machine.

In addition to their superior rheological properties, the compositions of this invention constitute improved adhesives because the clay is more thoroughly dispersed than has heretofore been possible in silicate-clay adhesives and hence remains suspended in the silicate during longer periods of quiescent storage. This is a great advantage since in the practical use of such adhesives settling of the clay leads to serious consequences. Settling may, for instance, cause clogging of pipe lines and valves, increased wear on pumps, and filling up, with resultant improper operation, of feed pans. Moreover, the clay which settled out of adhesives heretofore in use could be resuspended only with great difficulty, and was therefore ordinarily discarded with a consequent loss of material to the user. In the compositions of this invention, settling out of the clay is minimized, and any clay which does settle out is readily redispersible with a minimum of agitation.

Optimum rheological properties and freedom from settling are achieved in the compositions of this invention by a proper selection of chemical constituents and by uniting these chemical constituents while they are in suitable physical condition. The adhesives so produced have unique physical properties because of this correlation of chemical constituency and physical conditions of mixing. These physical properties, referred to above as rheological properties, are defined below with reference to their meaning as applied to silicate-clay compositions.

THIXOTROPY RATIO

Thixotropy is defined as the decrease in apparent viscosity of a system upon agitation; or, conversely, as the increase in apparent viscosity of a system upon standing at rest following a period of prolonged agitation. A single numerical value which serves to indicate quantitatively the degree of thixotropy associated with the silicate-clay system is obtained in the following manner:

Using a calibrated Stormer viscometer, the calibration equation of which is of the type $\eta = K(W-\beta)t$ where $\eta$ = viscosity in poises,
K = calibration constant,
W = weight of Stormer cord,
$\beta$ = frictional correction dependent on $t$ and found by calibration of various values of W and $t$, and
$t$ = time required for 100 revolutions of cylinder of machine.

The time required for each 5 revolution interval in a 100 revolution determination is measured with a weight of 100 grams on the cord. These times are multiplied by 20 and put into the calibration equation and the corresponding viscosities calculated. The viscosities are plotted on logarithmic paper against the total number of revolutions occurring up to the end of the interval in which the viscosity was measured. The best curve is drawn thru the plotted points. The apparent average viscosity is read from the curve at 10 and 100 total revolutions, and the former is divided by the latter, giving a value designated as the thixotropic ratio. For a non-thixotropic material, this ratio is 1; for a thixotropic material, the ratio is greater than 1, and the difference from 1 is a quantitative measure of thixotropy of the adhesive. This is a purely empirical expression for the degree of thixotropy associated with a system, but is valuable in allowing comparison of silicate-clay adhesives.

YIELD VALUE AND MOBILITY COEFFICIENT

Silicate-clay adhesives behave as soft or plastic solids and exhibit a definite "yield value" below which flow does not occur. Yield value is defined as the minimum force, expressed as the shearing stress in dynes per square centimeter, required to cause flow of the silicate-clay composition. It is determined as follows:

By means of a Stormer viscometer of the type described above, the rate of flow of the clay-silicate composition, that is, the speed of the viscometer drum, is determined under at least two different shearing stresses, applied as two different weights on the Stormer cord. The rates of flow, as ordinates, are plotted on coordinate paper against shearing stresses as abscissae and the best line is drawn thru the points. The intercept of this line on the abscissa axis is the yield value, and the slope of the line is the mobility coefficient.

The coefficient of mobility is therefore defined as the slope of the stress-flow gradient curve, expressed in rhes. It is determined as described above.

Mathematically, $D = M(S-Y)$ where D is the rate of flow, M is the coefficient of mobility, S is the shearing stress, and Y is the yield value. The mobility in plastic flow is the analogue of fluidity with true liquids, that is, liquids exhibiting true viscosity. It is to be noted that in the case of a true liquid, a measurement of rate of flow at a single value of shearing stress is sufficient to determine the viscosity, but in the case of a plastic system at least two measurements, at different stresses, are required to determine the slope of the stress-flow curve, or the mobility, and its intersection with the stress axis, namely, the yield value.

The relation of the above-described properties to the silicate-clay compositions of this invention and the manner of preparing such compositions will be better understood by reference to the following illustrative examples. In Examples 1 and 3 there is shown embodiments of the invention in which the clay content and sodium silicate content are varied.

Example 1

A smooth fluid clay slip was made up by dissolving 0.375 part by weight of trisodium phosphate and 0.25 part of tetrasodium pyrophosphate in 100 parts of water, adding 150 parts of china clay and stirring the mixture until the clay was completely dispersed.

The clay slip was heated to 175° F. and was then added to 1250 parts by weight of a sodium silicate solution analyzing 9.18% Na$_2$O, 29.39% SiO$_2$, and having an SiO$_2$:Na$_2$O weight ratio of 3.20, the mixing being effected by adding the slip as a thin stream directed into the vortex formed by agitating the silicate with a high speed mixer of the Lightnin type.

The silicate-clay composition was stored for one week, after which its rheological properties were measured. The yield value was found to be 36 dynes per square centimeter, mobility coefficient was 0.55 rhe, and the thixotropy ratio was 1.76. A 6¼ inch depth of well-mixed sample was placed in a glass cylinder and allowed to settle a week at 90° F. At the end of this time the adhesive was found to have no detectable quantitatively measured settlings.

Example 2

A fluid clay slip was made up by dispersing 150 parts by weight of china clay in 100 parts of water containing 0.375 part of trisodium phosphate and 0.25 part of tetrasodium pyrophosphate. This clay slip was then diluted with 140 parts of water and added to and dispersed in a sodium silicate solution at 175° F., the silicate solution being made by diluting with 45 parts of water 1065 parts by weight of sodium silicate solution having 9.18 per cent Na$_2$O, 29.39 per cent SiO$_2$, and an SiO$_2$:Na$_2$O weight ratio of 3.2. The dispersion was accomplished by directing the slip as a small stream into the vortex formed by stirring the silicate solution with a high-speed stirrer.

The rheological properties of the silicate-clay mixture were evaluated after one week of storage. The yield value was found to be 45 dynes per square centimeter, the coefficient of mobility 3.35 rhe, and the thixotropy ratio 1.56. A settling test showed that there was no substantial amount of settling of the clay after one week of quiescent storage.

The production of a silicate-clay adhesive containing an even larger amount of clay is shown in Example 3.

Example 3

A clay slip was made up by dissolving 0.422 part by weight of trisodium phosphate and 0.394 part of tetrasodium pyrophosphate in 112.5 parts of water, adding 225 parts of china clay, and agitating moderately until the clay was dispersed.

The clay slip was then dispersed without flocculation in 1162.5 parts by weight of a sodium silicate solution containing 9.18 per cent $Na_2O$, 29.39 per cent $SiO_2$, and having an $SiO_2:Na_2O$ weight ratio of 3.20, the slip being added as a small stream directed into the vortex produced by stirring the silicate solution with a high-speed stirrer.

The rheological properties were evaluated after one week of storage. The yield value was found to be 53 dynes per square centimeter. The mobility coefficient was .55 rhe, and the thixotropy ratio was 1.94. No substantial amount of settling of the clay was observed after one week of quiescent storage.

While a combination of trisodium phosphate and tetrasodium pyrophosphate was used as the defloculant or deflocculator in making the clay slips of Examples 1, 2, and 3, tetrasodium pyrophosphate alone or trisodium phosphate alone may be used as the defloculant as is shown in Examples 4 and 5 respectively.

*Example 4*

A clay slip was made up by dissolving 0.5 part by weight of tetrasodium pyrophosphate in 100 parts of water and dispersing 150 parts of china clay in this solution with moderate agitation. A smooth fluid slip was obtained. This slip was dispersed without flocculation in 1250 parts by weight of a sodium silicate solution containing 9.18 per cent $Na_2O$, 29.39 per cent $SiO_2$, and having an $SiO_2:Na_2O$ weight ratio of 3.20, the slip being directed as a small stream into the vortex produced by agitating the silicate solution with a high-speed stirrer, both the silicate solution and the slip being at a temperature of about 175° F. at the time of mixing. The silicate-clay composition so obtained was subjected to quiescent storage for one week and the rheological properties were then determined. The yield value was found to be 32 dynes per square centimeter, the mobility coefficient 0.54 rhe, and the thixotropy ratio 1.44.

*Example 5*

A clay slip was made up by dissolving .375 part by weight of trisodium phosphate in 100 parts of water and dispersing in this solution 150 parts of china clay with moderate agitation. A smooth fluid slip resulted. This slip was dispersed without flocculation in 1250 parts by weight of sodium silicate solution containing 9.18 per cent $Na_2O$, 29.39 per cent $SiO_2$, and having an $SiO_2:Na_2O$ weight ratio of 3.20, the slip being directed as a small stream into the vortex formed by stirring the silicate solution with a high-speed stirrer, and the slip and silicate solution both being at a temperature of 175° F. at the time of mixing. The product obtained was subjected to one week of quiescent storage, and the rheological properties were then determined. The yield value was found to be 44 dynes per square centimeter, the mobility coefficient 0.68 rhe, and the thixotropy ratio 1.79. No appreciable amount of settling of clay was observed after one week of standing.

The use of another defloculant in preparing the clay slip is shown in Example 6.

*Example 6*

A clay slip was made by diluting one part by weight of sodium silicate solution containing 9.18 per cent $Na_2O$, 29.39 per cent $SiO_2$, and having an $SiO_2:Na_2O$ weight ratio of 3.2 with 100 parts by weight of water and dispersing in this solution with moderate agitation 150 parts of china clay. A smooth fluid slip was obtained. This slip was dispersed without flocculation in 1250 parts by weight of a sodium silicate solution containing 9.18 per cent $Na_2O$, 29.39 per cent $SiO_2$ and having an $SiO_2:Na_2O$ weight ratio of 3.2, the slip being directed as a small stream into the vortex formed by stirring the silicate solution with a high speed stirrer, and both the slip and the silicate solution being at a temperature of 175° F. at the time of mixing. The product obtained was subjected to quiescent storage for one week, after which its rheological properties were determined. The yield value was found to be 38 dynes per square centimeter, the mobility coefficient was .54 rhe, and the thixotropy ratio was 1.66.

The use of ammonium tannate as the defloculant for making the clay slip used in preparing the silicate-clay compositions of this invention is shown in Example 7.

*Example 7*

A clay slip was made by dissolving 2.1 parts by weight of ammonium tannate as a defloculant in 100 parts of water and dispersing in this solution 150 parts of china clay with moderate agitation. A smooth fluid slip was obtained. This slip was dispersed without flocculation in 1250 parts of sodium silicate solution containing 9.18 per cent $Na_2O$, 29.39 per cent $SiO_2$ and having an $SiO_2:Na_2O$ weight ratio of 3.20, the slip being directed as a small stream into the vortex formed by agitating the silicate solution with a high-speed stirrer and both the slip and the silicate being at a temperature of 175° F. at the time of mixing. The product obtained was allowed to stand for one week, after which its rheological properties were determined. The yield value was found to be 35 dynes per square centimeter, the mobility coefficient 0.55 rhe, and the thixotropy ratio 1.52.

In the foregoing examples the preparation of silicate-clay compositions of this invention is shown using sodium silicate having an $SiO_2:Na_2O$ weight ratio of 3.20. Examples 8 and 9 show the use of sodium silicates having other weight ratios.

*Example 8*

A clay slip was made by dissolving .375 part by weight of trisodium phosphate and .25 part of tetrasodium pyrophosphate in 99 parts of water and dispersing therein with moderate agitation 150 parts of china clay. This clay slip was dispersed without flocculation in 1251 parts by weight of a sodium silicate solution containing 9.55 per cent $Na_2O$, 29.6 per cent $SiO_2$ and having an $SiO_2:Na_2O$ weight ratio of 3.10, the slip being directed as a small stream into the vortex formed by agitating the silicate solution with a high speed stirrer, and both the slip and the silicate solution being at a temperature of 175° F. at the time of mixing. The silicate-clay composition obtained was stored for one week, and its rheological properties were then determined. The yield value was found to be 41 dynes per square centimeter, the mobility coefficient was .62 rhe and the thixotropy ratio was 1.68.

*Example 9*

A clay slip was made by dissolving .375 part by weight of trisodium phosphate and .25 part of tetrasodium pyrophosphate in 100 parts of water and dispersing in this solution 150 parts of china clay with moderate agitation. A smooth fluid slip was obtained. This slip was then added to 1222 parts by weight of a sodium silicate solution containing 8.96 per cent $Na_2O$, 29.61 per cent $SiO_2$ and having an $SiO_2:Na_2O$ weight ratio of 3.30 to which had been added 28 parts by weight of water. The slip was dispersed without flocculation in the silicate solution by adding it as a small stream directed into the vortex produced by agitating the silicate solution with a high-speed stirrer. Both the silicate solution and the slip were at a temperature of 175° F. at the time of mixing. The silicate-clay composition obtained was stored for one week, after which its rheological properties were determined. The yield value was found to be 46 dynes per square centimeter, the mobility coefficient was .61 rhe, and the thixotropy ratio was 1.74.

While for the purposes of illustration there have been shown in the foregoing examples specific compositions and processes, it will be understood that these compositions and processes may be considerably modified or varied and that such modifications and variations are embraced in the scope of this invention, as disclosed hereinafter.

In preparing a clay slip for use in making a silicate-clay composition of this invention, the first step is to make a solution in water of a deflocculant capable of effecting dispersion of the clay to be used. The deflocculant may be selected from a wide variety of materials which the art has already recognized as deflocculants for clay. The trisodium phosphate, tetrasodium pyrophosphate, sodium silicate, and ammonium tannate of the foregoing examples are indicative of the class of materials which may be used, but it will be understood that other deflocculants such as, for instance, sodium hexametaphosphate, which are capable of dispersing clay in water to form a slip of high stability may suitably be employed.

The suitability of a deflocculant may be readily determined by a few simple experiments. An indication of such suitability may be obtained by titrating a 200 gram sample of the finished clay slip with 1 cc. portions of 39° Bé. (78° F.), 3.25 ratio sodium silicate solution with moderate agitation to the endpoint at which the composition is a mud which does not flow under its own weight. The amount of silicate solution required should be not less than about 2 cc., and preferably should be at least about 5 cc., since the larger the titration in this test, the greater will be the stability of the clay dispersion when added to the concentrated silicate to make the silicate-clay composition of this invention or the less will be the intensity of agitation required to give the desired stability.

The amount of deflocculant to use will depend upon the type and physical condition of the clay employed and upon the type of deflocculant used. The amount should be that which gives the greatest fluidity of the clay slip at moderate to high rates of flow. Using materials heretofore recognized as deflocculants for clay, ordinarily from about 0.25 to 2.5 per cent of deflocculant based on the weight of clay will suffice.

The second step in preparing a clay slip for use in silicate-clay compositions of this invention is to disperse the clay in the deflocculant solution. The degree of agitation required will vary with the condition of the clay, but in any event should be sufficient substantially to disperse the clay in the solution.

The clay employed in making the slip should be of a china clay or ball clay type having as its chief constituent kaolinite and should not contain appreciable amounts of constituents which tend to swell in water such as montmorrilonite. The amount of clay used should broadly comprise from about 30 to 65 per cent of the total weight of the slip, and preferably should be in the range from about 60 to 65 per cent of the weight of the slip.

Whatever deflocculant and clay are selected and whatever proportions are used, the finished slip in any event should be smooth, fluid, and should show a titration test of not less than about 2 cc. of 39° Bé., 3.25 ratio silicate solution for a 200 gram sample of slip by the test described above.

When a suitable clay slip has been made, the next step according to a process of this invention is to add this slip to a concentrated sodium silicate solution in a manner such that dispersion of the clay in the silicate will occur without substantial flocculation of the clay and with the production of an adhesive having the above-described rheological properties. To accomplish this result it is essential that effective agitation be provided at the point of mixing. Various means for achieving vigorous agitation at the point of mixing of two liquids are known in the art, and any of these methods may suitably be employed. In the foregoing examples such mixing was achieved by using a high-speed propeller-type agitator and adding the clay slip gradually to the vortex produced by this type of agitator. It is not necessary that all of the silicate solution be stirred with equal vigor; in the practice of this invention it has been found that when large masses of the silicate-clay compositions are produced it is preferable to provide a supplementary mixing tank in which vigorous agitation is more readily achieved and thru which silicate solution is continuously circulated from a larger tank, so that initial mixing of the slip and silicate is accomplished in the small mixing tank, and this mixture is then diluted with additional silicate in the larger tank. An alternative method for obtaining vigorous agitation is to bring together from separate sources streams of the silicate solution and of the clay slip and cause them to co-mingle in a tube, the velocity of the liquids or suspensions thru the tube being sufficiently high to cause turbulence of the liquids in the tube. Still another method of achieving vigorous agitation is to add the clay slip to the inlet side of a centrifugal pump, the impeller of which is being driven at a high rate of speed. Still another method is to introduce the clay slip into a silicate solution which is being agitated in a colloid mill in a manner such that immediate mixing occurs. Other methods of mixing will be readily apparent to those skilled in the art.

To obtain the silicate-clay compositions of this invention in which a minimum of clay settles out upon standing, it is important that the mixture of clay and silicate be brought to an elevated temperature either at the time of mixing or shortly thereafter. Substantial benefit is obtained by bringing the silicate-clay mixture to a temperature in the range from about 160 to 310° F. not later than about one-half hour after the initial mixing, it being necessary, of course, to hold the mixture under superatmospheric pressure if the higher temperatures in this range are desired. Preferably, a temperature in the range from about 160 to 200° F. for at least 5 to 10 minutes is used in order that one may dispense with the necessity for superatmospheric pressure.

The concentrated sodium silicate solution to which the clay slip is added should have an SiO$_2$:Na$_2$O weight ratio in the range from about 3.00 to 3.40. Particularly satisfactory results may be obtained using a solution having an SiO$_2$:Na$_2$O weight ratio of 3.25. The specific gravity of the silicate solution, which is a measure of its concentration, should be such that the viscosity of the solution is in the range from about 1 to about 5 poises at 78° F. With a 3.25 ratio silicate the gravity preferably should be from about 39 to about 43° Bé. at 78° F.; for higher ratios the gravity may be less and for lower ratios the gravity may be higher.

As has already been pointed out, compositions made according to the processes of this invention have physical properties which adapt them particularly well to use as fiberboard adhesives. The rheological properties in particular are such that the compositions constitute an improvement over the silicate-clay compositions heretofore used for this purpose. Moreover, these improved rheological properties are achieved according to the processes of this invention with the use of a minimum of clay. In view of the fact that the china clay employed in silicate adhesives is ordinarily more expensive than the silicate which it replaces, the economy and practicability of the compositions of this invention will be readily apparent.

The silicate-clay compositions of this invention may contain about from 5 to 12 per cent of china clay. If the maximum increase in yield point, mobility, and thixotropy ratio is desired as compared with the original silicate solution, it is preferred that the clay content be in the range of about from 9 to 11 per cent by weight of the final composition. The sodium silicate solids content of the compositions may vary about from 24 to 38 per cent of the weight of the final composition, although best results will ordinarily be obtained with a sodium silicate solids content in the range of about from 30 to 36 per cent. The clay content and the sodium silicate solids content are interdependent, the permissible sodium silicate solids content decreasing as the clay content is increased. This relation is such that the sum of the per cents of clay and of sodium silicate solids contained in the adhesive is about from 35 to 45 per cent by weight of the adhesive.

Compositions made according to the processes of this invention are characterized by having yield points in the range of about from 25 to 150 dynes per square centimeter, the preferred compositions having yield points of about from 35 to 60 dynes per square centimeter. The compositions are further characterized by having mobility coefficients in the range between about 0.3 to 4.0 rhes, the preferred compositions having coefficients of mobility from about .4 to .6 rhe. The thixotropy ratio of the compositions is not less than about 1.3.

The compositions of this invention are further characterized in that for each per cent of clay in the compositions the yield point will be not less than 5 dynes per square centimeter and the thixotropy ratio will be not less than 0.26.

While in the foregoing description of this invention there has been shown certain specific silicate-clay compositions and certain specific processes, it will be understood that without departing from the spirit of this invention one skilled in the art may readily produce numerous compositions and apply various processes.

This application is a continuation-in-part of application Ser. No. 161,032 filed August 26, 1937, by Ernest R. Boller.

I claim:

1. In a process for producing a sodium silicate-clay adhesive, the steps comprising agitating china clay, in an amount equivalent to about from 5 to 12 per cent by weight of the adhesive, with an aqueous solution of a deflocculant for the clay to obtain a fluid clay slip and adding the slip to an amount of concentrated sodium silicate solution such that the sodium silicate solids content of the final composition is from about twenty-four to thirty-eight per cent by weight with a degree of agitation at the point of mixing such that dispersion of the clay in the silicate is effected without flocculation of the clay, the mixture being subjected to a temperature of about from 160 to 310° F.

2. In a process for producing a sodium silicate-clay adhesive, the steps comprising agitating china clay, in an amount equivalent to about from five to twelve per cent by weight of the adhesive, with an aqueous solution of a deflocculant for the clay selected from the group consisting of trisodium phosphate, tetrasodium pyrophosphate, sodium hexametaphosphate, sodium silicate, and ammonium tannate, whereby a fluid clay slip is produced, and adding the slip to an amount of concentrated sodium silicate solution such that the sodium silicate solids content of the final composition is about from twenty-four to thirty-eight per cent by weight with a degree of agitation at the point of mixing such that dispersion of the clay in the silicate is effected without flocculation of the clay, the mixture being subjected to a temperature of about from 160 to 310° F.

3. In a process for producing a sodium silicate-clay adhesive, the steps comprising agitating china clay, in an amount equivalent to about from five to twelve per cent by weight of the adhesive, with an aqueous solution of a deflocculant for the clay to obtain a fluid clay slip and adding the slip to an amount of concentrated sodium silicate solution such that the sodium silicate solids content of the final composition is about from twenty-four to thirty-eight per cent by weight with a degree of agitation at the point of mixing such that dispersion of the clay in the silicate is effected without flocculation of the clay, the mixture being subjected to a temperature of about from 160 to 200° F.

4. In a process for producing a sodium silicate-clay adhesive, the steps comprising agitating china clay, in an amount equivalent to about from 5 to 12 per cent by weight of the adhesive, with an aqueous solution of a deflocculant for the clay, whereby a fluid clay slip is obtained, and then adding the slip to a concentrated sodium silicate solution having a specific gravity and an SiO$_2$:Na$_2$O weight ratio such that the apparent viscosity of the solution is from about 1 to 5 poises at 78° F., the degree of agitation at the point of mixing of the slip and silicate solution being such that dispersion of the clay in the silicate is sufficiently vigorous that dispersion of the clay in the silicate is effected without flocculation of the clay, the mixture being subjected to a temperature of about from 160 to 310° F.

5. In a process for producing a sodium silicate-clay adhesive, the steps comprising agitating china clay, in an amount equivalent to about from 5 to 12 per cent by weight of the adhesive, with an aqueous solution containing a deflocculant in an amount equal to from about 0.25 to 2.5 per cent of the weight of clay, the deflocculant being selected from the group consisting of trisodium phosphate, tetrasodium pyrophosphate, sodium hexametaphosphate, sodium silicate, and ammonium tannate, whereby a fluid clay slip is produced, and adding the slip to a sodium silicate solution having a specific gravity of about from 39 to 43° Bé. at 78° F. and an $SiO_2:Na_2O$ weight ratio of about from 3.00 to 3.40, with such vigorous agitation at the point of mixing that dispersion of the clay in the silicate is effected without flocculation of the clay, the mixture being subjected to a temperature of about from 160 to 310° F.

6. In a process for producing a sodium silicate-clay adhesive, the steps comprising agitating china clay, in an amount equivalent to about from 5 to 12 per cent by weight of the adhesive, with an aqueous solution of trisodium phosphate and tetrasodium pyrophosphate as deflocculants for the clay, the combined amount of trisodium phosphate and tetrasodium pyrophosphate in the solution being from about 0.25 to 2.5 per cent of the weight of clay, whereby a fluid clay slip is obtained, and adding the slip to a concentrated sodium silicate solution with a degree of agitation at the point of mixing such that dispersion of the clay in the silicate is effected without flocculation of the clay, the mixture being subjected to a temperature of about from 160 to 310° F.

7. In a process for producing a sodium silicate-clay adhesive, the steps comprising agitating china clay, in an amount equivalent to about from 9 to 11 per cent by weight of the adhesive, with an aqueous solution containing a deflocculant in an amount equal to from about 0.25 to 2.5 per cent of the clay, the deflocculant being selected from the group consisting of trisodium phosphate, tetrasodium pyrophosphate, sodium hexametaphosphate, sodium silicate, and ammonium tannate, whereby a fluid clay slip is produced, and adding the slip to a sodium silicate solution having a specific gravity of about from 39 to 43° Bé. at 78° F. and an $SiO_2:Na_2O$ weight ratio of about 3.25, with such vigorous agitation at the point of mixing that dispersion of the clay in the silicate is effected without flocculation of the clay, the mixture being subjected to a temperature of about from 160 to 200° F.

8. A sodium silicate-china clay adhesive comprising about from 5 to 12 per cent by weight of china clay, about from 24 to 38 per cent by weight of sodium silicate solids, the sum of the per cents of clay and sodium silicate solids being about from 35 to 45, and the sodium silicate having an $SiO_2:Na_2O$ weight ratio of about from 3.0 to 3.4, the adhesive being characterized by having a yield point of about from 25 to 150 dynes per square centimeter, a coefficient of mobility of about from 0.3 to 4.0 rhes, and a thixotropy ratio no less than about 1.3, and being further characterized by having a yield point of not less than 5 dynes per square centimeter for each per cent of clay in the adhesive.

9. A sodium silicate-china clay adhesive comprising about from 5 to 12 per cent by weight of china clay, about from 24 to 38 per cent by weight of sodium silicate solids, the sum of the percents of clay and sodium silicate solids being about from 35 to 45, and the sodium silicate having an $SiO_2:Na_2O$ weight ratio of about from 3.0 to 3.4, and a minor amount of a mixture of trisodium phosphate and tetrasodium pyrophosphate as a clay deflocculant, the adhesive being characterized by having a yield point of about from 25 to 150 dynes per square centimeter, a coefficient of mobility of about from 0.3 to 4.0 rhes, and a thixotropy ratio no less than about 1.3 and being further characterized by having a yield point of not less than 5 dynes per square centimeter for each per cent of clay in the adhesive.

10. A sodium silicate-china clay adhesive comprising about from 9 to 11 per cent by weight of china clay, about from 30 to 36 per cent by weight of sodium silicate solids, the sum of the per cents of clay and sodium silicate solids being about from 35 to 45, and the sodium silicate having an $SiO_2:Na_2O$ weight ratio of about from 3.20 to 3.30, the adhesive being characterized by having a yield point of about from 35 to 60 dynes per square centimeter, a coefficient of mobility of about from 0.4 to 0.6 rhe, and a thixotropy ratio no less than about 1.3, and being further characterized by having a yield point of not less than 5 dynes per square centimeter for each per cent of clay in the adhesive.

11. A sodium silicate-china clay adhesive comprising about from 9 to 11 per cent by weight of china clay, about from 30 to 36 per cent by weight of sodium silicate solids, the sum of the per cents of clay and sodium silicate solids being about from 35 to 45, and the sodium silicate having an $SiO_2:Na_2O$ weight ratio of about from 3.20 to 3.30, and about from 0.01 to 0.30 per cent by weight of a mixture of trisodium phosphate and tetrasodium pyrophosphate as a deflocculant for the clay, the adhesive being characterized by having a yield point of about from 35 to 60 dynes per square centimeter, a coefficient of mobility of about from 0.4 to 0.6 rhe, and a thixotropy ratio no less than about 1.3, and being further characterized by having a yield point of not less than 5 dynes per square centimeter for each per cent of clay in the adhesive.

ERNEST R. BOLLER.